United States Patent
Gong

(10) Patent No.: US 7,089,183 B2
(45) Date of Patent: Aug. 8, 2006

(54) ACCUMULATING TRANSFORMATIONS FOR HIERARCHICAL LINEAR REGRESSION HMM ADAPTATION

(75) Inventor: Yifan Gong, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 1072 days.

(21) Appl. No.: 09/887,394

(22) Filed: Jun. 22, 2001

(65) Prior Publication Data

US 2002/0035473 A1 Mar. 21, 2002

Related U.S. Application Data

(60) Provisional application No. 60/222,596, filed on Aug. 2, 2000.

(51) Int. Cl.
*G10L 15/06* (2006.01)

(52) U.S. Cl. .................. 704/244; 704/256.2
(58) Field of Classification Search ........ 704/244, 704/256.2, 243, 256, 256.1, 226, 227
See application file for complete search history.

(56) References Cited

U.S. PATENT DOCUMENTS

| | | | |
|---|---|---|---|
| 5,930,753 A * | 7/1999 | Potamianos et al. ........ 704/256 |
| 6,003,002 A * | 12/1999 | Netsch ..................... 704/236 |
| 6,253,180 B1 * | 6/2001 | Iso ........................... 704/244 |

FOREIGN PATENT DOCUMENTS

| EP | 0 913 809 A2 | 5/1999 |
|---|---|---|
| EP | 1 008 983 A1 | 6/2000 |

OTHER PUBLICATIONS

Gong, Y. and John J. Godfrey, "Transforming HMMs for Speaker-Independent Hands-Free Speech Recognition in the Car," Proc. 1999 IEEE Int. Conf. on Acoust., Speech, and Sig. Proc., 1999 ICASSP '99, Mar. 15-19, 1999, vol. 1, pp. 297-300.*

Afify,M., Y.Gong, and J.-P.Haton, "A Unified Maximum Likelihood Approach to Acoustic Mismatch Compensation: Application to Noisy Lombard Speech Recognition," Proc. 1997 IEEE IAcoust., Speech, and Sig. Proc., ICASSP-97,Apr. 21-24, 1997, vol. 2, pp. 839-842.*

* cited by examiner

Primary Examiner—Richemond Dorvil
Assistant Examiner—Donald L. Storm
(74) Attorney, Agent, or Firm—W. James Brady, III; Frederick J. Telecky, Jr.

(57) ABSTRACT

A new iterative hierarchical linear regression method for generating a set of linear transforms to adapt HMM speech models to a new environment for improved speech recognition is disclosed. The method determines a new set of linear transforms at an iterative step by Estimate-Maximize (EM) estimation, and then combines the new set of linear transforms with the prior set of linear transforms to form a new merged set of linear transforms. An iterative step may include realignment of adaptation speech data to the adapted HMM models to further improve speech recognition performance.

2 Claims, 2 Drawing Sheets

ACCUMULATING TRANSFORMATIONS FOR HIERARCHICAL LINEAR REGRESSION HMM ADAPTATION

This application claims priority under 35 USC § 119(e)(1) of provisional application No. 60/222,596, filed Aug. 2, 2000.

FIELD OF INVENTION

This invention relates to speech recognition and more particularly to adaptive speech recognition with hierarchical linear regression Hidden Markov Model (HMM) adaptation.

BACKGROUND OF INVENTION

Hierarchical Linear Regression (HLR) (e.g. MLLR [See C. J. Leggetter and P. C. Woodland, "Maximum likelihood linear regression for speaker adaptation of continuous density HMMs," Computer, Speech and Language, 9(2):71–185, 1995]) is now a common technique to transform Hidden Markov Models(HMMs) for use in an acoustic environment different from the one in which the models are initially trained. The environments refer to speaker accent, speaker vocal tract, background noise, recording device, transmission channel, etc. HLR improves word error rate (WER) substantially by reducing the mismatch between training and testing environments [See C. J. Leggetter cited above].

Hierarchical Linear Regression (HLR) is a process that creates a set of transforms that can be used to adapt any subset of an initial set of Hidden Markov Models (HMMs) to a new acoustic environment. We refer to the new environment as the "target environment", and the adapted subset of HMM models as the "target models". The HLR adaptation process requires that some adaptation speech data from the new environment be collected, and converted into sequences of frames of vectors of speech parameters using well-known techniques. For example, to create a set of transforms to adapt an initial set of speaker-independent HMMs to a particular speaker who is using a particular microphone, adaptation speech data must be collected from the speaker and microphone, and then converted into frames of parameter vectors, such as the well-known cepstral vectors.

There are two well known HLR methods for creating a set of transforms. In the first method, the adaptation speech data is aligned to states of the initial set of HMM models using well-known HMM Viterbi recognition alignment methods. A regression tree is formed which defines a hierarchical mapping from states of the initial HMM model set to linear transforms. Then the set of linear transforms is determined that adapts the initial HMM set so as to increase the likelihood of the adaptation speech data. While this method results in better speech recognition performance, further improvement is possible. The second method uses the fact that transforming the initial HMM model set by the first set of linear transforms yields a second set of HMMs. This second set of HMMs can be used to generate a new alignment of the adaptation speech data to the second set of HMMs. Then it is possible to repeat the process of determining a set of linear transforms that further adapts the second HMM set so as to increase the likelihood of the adaptation data. This process can be repeated iteratively to continue improving the likelihoods. However, this requires that after each iteration either a new complete set of HMMs is stored, or that each new set of linear transforms is stored so that the new HMM set can be iteratively derived from the initial HMM set. This can be prohibitive in terms of memory storage resources. The subject of this invention is a novel implementation of the second method such that only the initial HMM set and a single set of linear transforms must be stored, while maintaining exactly the performance improvement of the second method and reducing the processing required. This is important in applications where memory and processing time are critical and limited resources.

SUMMARY OF INVENTION

A new method is introduced which builds the set of HLR adapted HMM models at any iteration directly from the initial set of HMMs and a single set of linear transforms in order to minimize storage. Further, the method introduces a procedure that merges the multiple sets of linear transforms from each iteration into a single set of transforms while guaranteeing the performance is identical to the present-art iterative methods. The goal of the method to be described is to provide a single set of linear transforms which combines all of the prior sets of transformations, so that a target model subset at any iteration can be calculated directly from the initial model set and the single set of transforms.

DESCRIPTION OF PREFERRED EMBODIMENT

Figure 1:
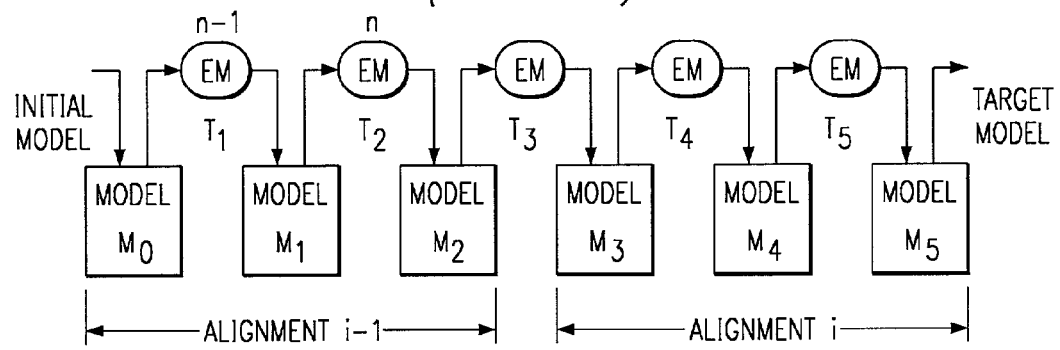
FIG. 1 illustrates the present art HLR methods where the final target models are obtained by successive application of several sets of transformations $T_1, T_2 \ldots$.
Figure 3:
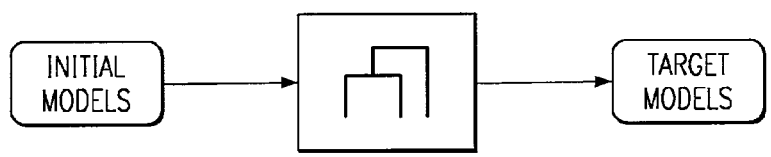
FIG. 3 illustrates new target models are obtained by a single application of one set of transforms and one set of hierarchical mappings of HMM models to transformations.
Figure 4:
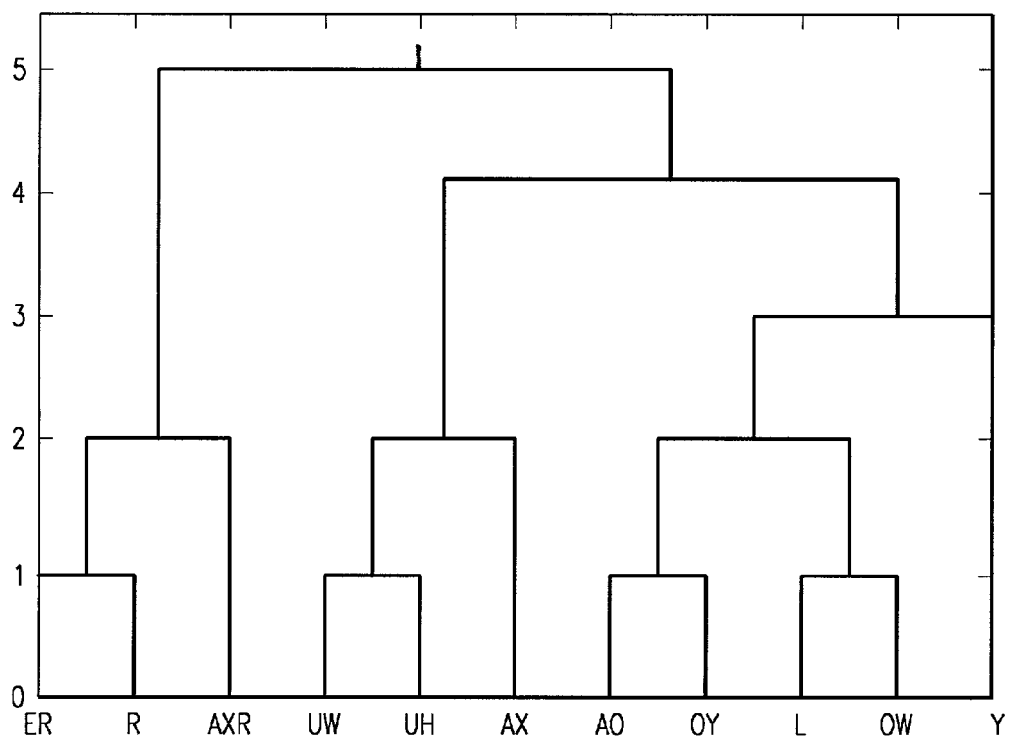
FIG. 4 illustrates part of a regression tree which maps HMM models to transforms.
Figure 5:
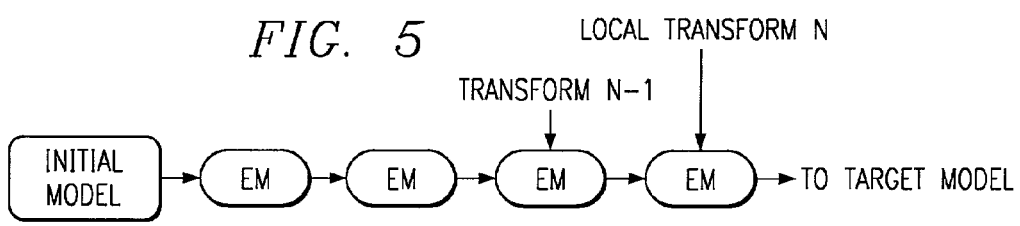
FIG. 5 illustrates the operation of multiple iterations of Estimate-Maximize (EM) adaptation according to one embodiment of the present invention.

In accordance with the present invention-as illustrated in FIG. 3 and FIG. 5, the disclosed method using multiple iterations of the well-known Estimate-Maximize (EM) algorithm, builds a single set of linear transforms that can transform any subset of the initial HMM model set to adapt it to a new environment. This is accomplished by a novel method which combines multiple sets of linear transforms into a single transform set. FIG. 1 illustrates the process of creating sets of linear transforms according to present-art. The process begins with an initial model set $M_0$, and speech data collected in the new environment. In addition, the process starts with a hierarchical regression tree, of which a portion is illustrated in FIG. 4. In the preferred embodiment, the hierarchical regression tree is used to map initial monophone HMM models to linear transforms. While in the preferred embodiment the mapping is from monophone HMM models to linear transforms, it should be understood that the mapping could be from any component of an HMM model, such as a probability density function or cluster of distributions. The hierarchical regression tree is used during creation of the set linear transforms to determine how many linear transforms will exist, and what data is used to generate each linear transform. This will be described in detail below.

As can be seen in FIG. 1, the process of creating linear transforms is iterative. At the start of the process, the adaptation speech data is aligned with the initial model set $M_0$ using well-known Viterbi HMM speech recognition procedures. This results in a mapping defining which portions of the adaptation speech data correspond to monophone models of the initial HMM set. It is possible that the adaptation speech data does not contain any instance of some monophones. It is still desirable to create linear transforms that can be used to transform even those monophones for which there is little or no adaptation data. This is the purpose of the hierarchical regression tree. Once the alignment between adaptation speech and monophone HMMs is performed, a count of number of adaptation speech frame occurrences mapping to each monophone in the adaptation data is made. A cumulative sum of the number of occurrences of monophones under each node of the regression tree is made. A linear transform will be constructed for each monophone HMM or group of monophone HMMs such that the cumulative sum at the lowest node connected to the monophone is at least as large as a threshold value. For example, consider the UW, UH, and AX monophones in the regression tree of FIG. 4. Suppose the threshold value is set to 100, and that there are 100 instances of the adaptation frames mapping to monophone AX in the training data, 2 instances mapping to the UW monophone, and 1 instance mapping to the UH monophone. According to the regression tree of FIG. 4, a linear transform will be created for the AX monophone itself since there are 100 instances mapping to AX in the adaptation data. There are not enough instances mapping to UW or UH to create a unique transform for each of these monophones. Continuing up the regression tree from UW and UH, the cumulative sum is 3 instances. This is still not greater than the threshold. Continuing further up the regression tree, the cumulative sum for UW, UH and AX is 103, which is larger than the threshold value, so the adaptation data for the UW, UH, and AX monophones will be combined to form 103 instances that will be used to form a linear transform that will be used to adapt both the UW and UH monophones.

Referring again to FIG. 1, the aligned adaptation data is used in a well-known Expectation Maximization (EM) algorithm to calculate maximum likelihood estimate of the parameters of the linear transform set $T_1$. The set of transformations $T_1$ can be applied to the initial HMM model set $M_0$ to form a new set of models $M_1$. At this point, the procedure can be iterated. While the first step of the next iteration would typically be aligning the adaptation data with the new model set $M_1$, we have found that we can obtain equally good recognition performance improvement by only performing alignment each N-th iteration, where N is usually 3 or 4. Between alignment iterations, only the EM process is performed. This saves additional computation, since the alignment process does not need to be performed for each iteration.

Figure 2:
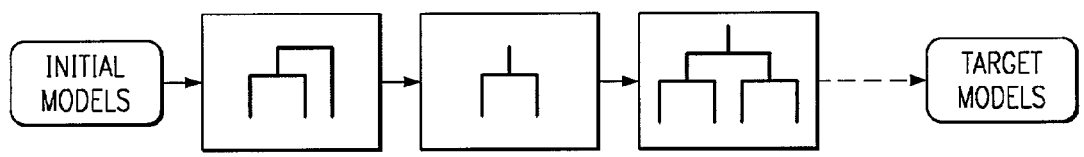
FIG. 2 illustrates present-art target models are obtained by successive application of several sets of transforms having different hierarchical mappings of HMM models to transforms.

Referring to FIG. 1, in present art HLR adaptation systems, either the successive sets of HMM models $M_1$, $M_2$, etc, or the sets of transformations, $T_1$, $T_2$, etc, must be stored to continue iteration. Typically, since model sets are much larger than transformation sets in memory storage requirements, it would be preferable to store the sets of transformations. This, of course, requires dynamically calculating the new HMM model set by applying in succession each transformation $T_1$, $T_2$, etc, increasing greatly the amount of computation required. This is illustrated in FIG. 2, where it must be noted that each linear transform set also has a distinct hierarchical mapping, since counts of monophones at each hierarchical tree node may be different. As a novel aspect of this invention, we describe below a method, illustrated in FIG. 3, whereby transformations can be merged at each iteration. This results in a large saving of computation and memory storage. It also provides flexibility, since only the initial HMM model set needs to be stored along with a single set of transforms, and any subset of the initial HMM model set can be adapted by the set of transforms for limited recognition tasks.

The method of implementing HLR adaptation with merged transforms is now described in detail.

Let $\Xi = \{\xi_1, \xi_2, \ldots \xi_N\}$ be the set of nodes of the regression tree. Leaf nodes $\Omega \subset \Xi$ of the tree correspond to a class which needs to be adapted. A class can be either an HMM, a cluster of distributions, a state PDF, etc., depending on the adaptation scheme. In the preferred embodiment, it is a monophone HMM. A leaf node $\alpha \in \Omega$ is assigned the number $m(\alpha, n)$ of adaptation frame vectors associated with the node at iteration n by the alignment of the adaptation speech data to the leaf node class. As mentioned previously, FIG. 4 shows part of a tree with leaves corresponding to monophone HMMs.

Define the function:

$$\phi : \Xi \mapsto \Xi$$

such that $\Xi_j = \phi(\Xi_k) j \neq k$ is the root of the node $\Xi_k$ (the node above $\Xi_k$). Similarly, introduce the function $$\phi : \Xi \times [0,1] \mapsto \Xi$$

such that $\xi = \phi(\phi(\xi, k))$, i.e. $\phi(\xi, k)$ is the k-th descendent of the node $\xi$.

At each iteration of parameter estimation, to each node is associated a number $\rho(\xi, n)$ recording the count of the cumulative number of adaptation speech data vectors under the node.

$$\rho(\xi, n) = \begin{cases} m(\xi, n) & \text{if } \xi \in \Omega \\ \sum_k \rho(\varphi(\xi, k), n) & \text{otherwise} \end{cases}$$

A node is called reliable if $$\rho(\xi, n) > P$$

where P is a constant, fixed for each alignment. The function $$\psi : \Xi \times N \mapsto [\text{False, True}]$$

such that $\psi(\xi, n)$ indicates if a node is reliable at the n-th iteration. Note that at each iteration, since the alignment between leaf nodes and speech signals may change, $\psi$ is a function of n. Only reliable nodes are assigned a transform $T_\xi^n$. Each leaf node, which in the preferred embodiment is an HMM, has its transform located on the first reliable node given by recursively tracing back to the roots.

Introduce another function:

$$\chi : \Xi \times N \mapsto \Xi$$

such that $\Xi = \chi(\xi, n)$ is the first root node of $\xi$ that satisfies $\psi(\xi, n) = \text{True}$.

The invention uses a general form for the linear regression transforms, which applies a linear transform T to a mean vector μ of a Gaussian distribution associated with an HMM state:

$$\hat{\mu} = T(\mu) = A\mu + B$$

where A is a D×D matrix, and B a D-dimensional column vector. As a novel aspect of the invention, at any iteration n, the current model corresponding to a leaf node α is always obtained by transforming its initial model means. That is, the original model means are mapped to the adapted model means at iteration n as:

$$\forall n \forall \alpha, \hat{\mu}_{\alpha,n} = \hat{T}_{\chi(\alpha,n)}^n(\mu_{\alpha,0}) \hat{A}_{n,\chi(\alpha,n)} = \mu_{\alpha,0} + \hat{B}_{n,\chi(\alpha,n)}$$

The merging of transforms is now described in detail. Referring to FIG. 1, there can be distinguished two types of parameter estimation iterations: between EM iterations and between alignment iterations. Each type of iteration requires a unique method to merge transforms. The method of combination for each time is described below.

Merging Transforms Between EM Estimations
Given
The set of transforms that maps the initial models through n−1 iterations which we term a global transform set at n−1.
The set of transformations that maps the models at the n−1-th iteration to the models at the iteration n using EM estimation with no alignment, which we term a local transform set at n.

The goal is to determine the resultant merged transform set that will be global at n, and will combine the global at n−1 and local at n transform sets.

It is important to note that between EM re-estimation iterations, no alignment of the adaptation speech data to the adapted models is performed, in order to save computation. Since no alignment is performed between the EM re-estimation iterations, the alignment is fixed, so the reliable node information is unchanged, and the association between nodes and transforms is fixed. That is, between the EM re-estimation iterations the functions ρ, ψ, and χ remain fixed.

Let $\hat{A}_{n-1,\xi}$ and $\hat{B}_{n-1,\xi}$ be the global transform parameter set derived at iteration n−1, and $A_{n,\xi}$ and $B_{n,\xi}$ be the local transform parameter set derived at EM iteration n. Then the single transform set global at n formed by merging is denoted as $\hat{A}_{n,\xi}$ and $\hat{B}_{n,\xi}$ and is calculated for all ξ such that ψ(ξ,n) is True as:

$$\begin{cases} \hat{A}_{0,\xi} = I \\ \hat{B}_{0,\xi} = 0 \\ \hat{A}_{n,\xi} = A_{n,\xi} \hat{A}_{n-1,\xi} \\ \hat{B}_{n,\xi} = A_{n,\xi} \hat{B}_{n-1,\xi} + B_{n,\xi} \end{cases}$$

Let the above merging operations of transform sets be denoted as:

$$\hat{T}_\xi^n = T_\xi^n \oplus \hat{T}_\xi^{n-1}$$

Merging Transforms Between Alignment Iterations
Given
The set of transforms that maps the initial models through n−1 iterations and using the i−1th alignment which is global for n−1 and i−1.

The set of transforms that maps the models at the n−1th iteration and the i−1th alignment to the models at the i-th alignment and iteration n, which is local at n.
The set of reliable node information given by the functions ρ, ψ, and χ which is valid for alignment i−1.
The set of reliable node information given by the functions ρ, ψ, and χ which is valid for alignment i The goal is to determine the set of accumulated transformations, global at n and i, which combines the global transform set at iteration n−1 and alignment i−1 and the local transformation at iteration n and alignment i.

In contrast to the accumulation between two EM iterations, the alignment here may be changed, which results in a change in the reliable node information. Therefore the association between nodes and transformations cannot be assumed fixed from the i−1 to i-th alignment and n−1 to n-th iteration. The number of transformations at alignment i may different from that at i−1 for two reasons:

The value of the fixed constant P may change. Typically, P is decreased to increase the number of transformations as the number of alignments i increases.

Even if P is kept constant, since the HMM parameters are different at each alignment, the functions ρ, ψ, and χ may change as a function of i.

Then merged global transformation set is given by:

$$\hat{T}_\xi^n = \begin{cases} \hat{T}_\xi^{n-1} \oplus T_\xi^n & \text{if } \psi(\xi, i-1) \wedge \psi(\xi, i) \\ \hat{T}_\xi^{n-1} \oplus T_{\chi(\xi,i)}^n & \text{if } \psi(\xi, i-1) \wedge \neg \psi(\xi, i) \\ \hat{T}_{\chi(\xi,i-1)}^{n-1} \oplus T_\xi^n & \text{if } \neg \psi(\xi, i-1) \wedge \psi(\xi, i) \\ \text{None} & \text{Otherwise} \end{cases}$$

Figure 6:
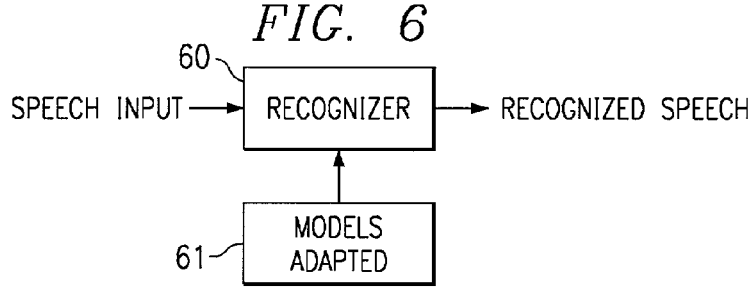
FIG. 6 illustrates the system according to one embodiment of the present invention.

Referring to FIG. 6, there is illustrated a system according to one embodiment of the present invention wherein the input speech is compared to models at recognizer 60 wherein the models 61 are HMM models that have been adapted using a single set of linear transforms. The single set of linear transforms utilize parameters wherein multiple EM iterations and multiple alignments to adaptation speech data have been used to generate multiple sets of transforms, which are merged according to the present invention to form the single set of linear transforms.

The invention claimed is:

1. A method of hierarchical linear regression to develop a set of linear transforms for adaptation of an initial set of Hidden Markov Models (HMM) to a new environment comprising the steps of:
   providing an initial set of HMM models
   obtaining adaptation speech data from a new acoustic environment,
   adapting the initial set of models to the new acoustic environment by a procedure comprising the steps of creating an alignment of the adaptation speech data to the HMM model set, then performing the iterative steps of Estimate-Maximize (EM) estimation to generate a local set of linear transforms, merging the local set of linear transforms with a set of prior global transforms to form a new global set of transforms, adapting the initial set of HMM models using the new global set of transforms, and beginning a new EM estimation iteration step to repeat the procedure.

2. The method of claim 1 wherein after a number of EM estimation iteration steps the steps of realigning the adaptation speech data with the adapted HMM models wherein parameters can be adjusted to expand the set of linear transforms, performing an EM estimation step to generate a new set local transforms, combining the new local transforms with the prior set of global transforms to form a new set of global transforms in accordance with the realignment, and further performing iterative steps of EM estimation.

* * * * *